Sept. 14, 1965  E. C. LETTER  3,205,764
ABSORPTION CELL WITH REMOVABLE WINDOWS
Filed Sept. 1, 1961
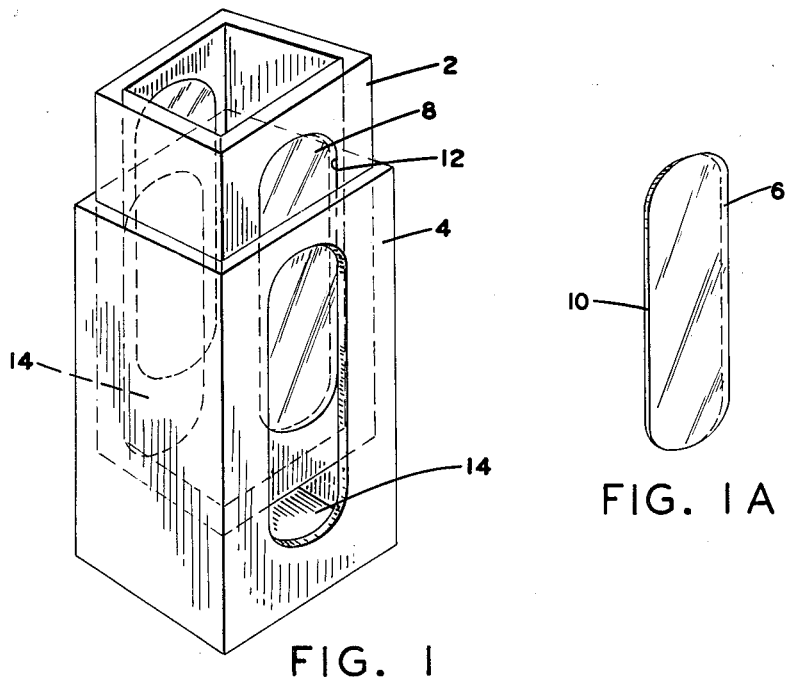
FIG. 1
FIG. 1A
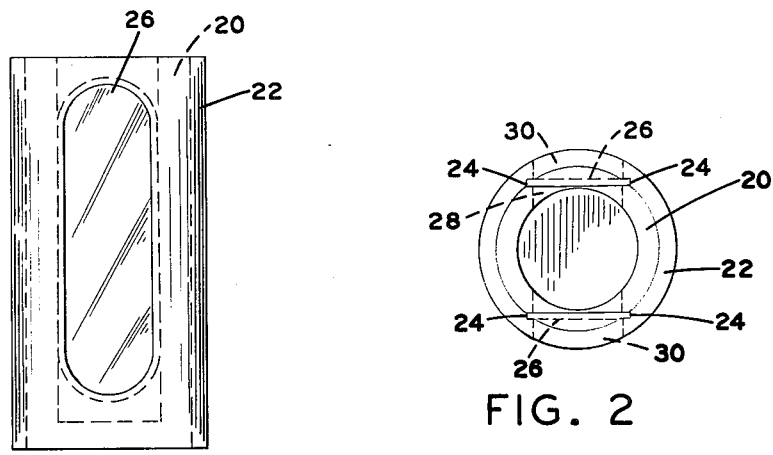
FIG. 3
FIG. 2
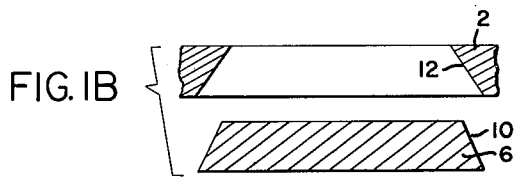
FIG. 1B
INVENTOR.
EUGENE C. LETTER
BY
ATTORNEYS

United States Patent Office 3,205,764
Patented Sept. 14, 1965

3,205,764
ABSORPTION CELL WITH REMOVABLE WINDOWS
Eugene C. Letter, Walworth, N.Y., assignor to Bausch & Lomb Incorporated, Rochester, N.Y., a corporation of New York
Filed Sept. 1, 1961, Ser. No. 135,654
3 Claims. (Cl. 88—14)

This invention relates to a novel absorption cell and more particularly to a novel absorption cell having a pair of fused silica windows.

The widespread commercial acceptance of spectrophotometers and the like has resulted in an increased demand for absorption cells. Absorption or sample cells as they are often called, normally require a pair of fused silica windows. These windows are manufactured to precision optical standards and require a high degree of care to obtain accurate thickness, flatness, and positioning. The expense of manufacturing cells to optical standards is relatively great, however, this expense is further multiplied by the use of fused silica.

The demand for inexpensive sample cells is increased by the use of optical analysis in production operations. In production work, the operators are normally unskilled personnel who do not appreciate the cost of precision cells. Removing the cells from a laboratory area to a production area increases the loss of cells due to scratching the surfaces, breaking the cells, and misplacing them. Accordingly, there is a relatively large industrial demand for a sample cell having a pair of quartz windows, which is manufactured to precision optical standards and which is relatively inexpensive.

A sample cell according to the present invention may include a pair of fused silica windows. The windows are manufactured and positioned to precision optical standards and the resulting cell is durable in service. The cells are resistant to corrosive chemicals and may be used in analyzing caustics, acids, and organic solvents. The durability of the cells according to the invention is as good as conventional fused silica cells; however, the manufacturing costs are reduced by the novel design. More particularly, the present structure overcomes problems associated with manufacturing fused cells and the problem of damaging cemented structures by solvents. The cost reduction and straight forward design have been combined to overcome a long felt commercial need in the field of optical analysis.

Briefly, an absorption cell according to the present invention, comprises a rigid housing and an insert. The insert is preferably made of plastic and has an opening adapted to receive a hard glass or quartz window therein. The window is placed in position in the opening and is held in place by being forced inwardly against the insert by the rigid support or outer housing. The outer housing positions the window against the opening of the insert and maintains the position of the window. Since the inner surface of the outer housing governs the position of the window and maintains the accurate alignment; it is machined to precision tolerances. The outer housing is normally made of metal and is therefore much easier and cheaper to machine than quartz. The quartz window or windows still require machining to precision optical standards, however the work on the quartz is substantially reduced. The insert includes a cavity which may be partially formed by the window. This cavity has an opening so that fluid may be placed in the cell for absorption analysis.

The preferred embodiments of the invention incorporate a polytetrafluoroethylene insert having a shape generally similar to a parallelepiped or a shape generally similar to a right cylinder. The insert may be molded and has a cavity and a pair of openings, one facing the other on opposite sides of the cavity. The openings are tapered inwardly toward the center of the cavity i.e. they converge toward each other at the inner surface and are adapted to receive a pair of windows which are similarly tapered. The taper on the windows have a slight angular difference from the taper on the insert, so that, a seal is formed between the window and the insert when the window is wedged between the insert and the housing. The rigid housing is made of metal and has a shape generally similar to the insert. The housing is made to precision tolerances and positions the pair of windows in a parallel relationship to each other.

The invention will now be described in more detail in connection with the accompanying drawings, in which:

FIG. 1 is a perspective view showing a partially assembled sample cell according to a first embodiment of the invention;

FIG. 1A is a perspective view of a window which houses a part of the cell shown in FIG. 1;

FIG. 1B is a schematic illustration showing the differences in taper between two elements of the cell;

FIG. 2 is a top plan view illustrating a second embodiment of the invention; and FIG. 3 is a side elevational view of a sample cell according to the second embodiment of the invention.

A sample cell, according to the first embodiment of the invention has a shape generally similar to a parallelepiped. An insert 2, is molded of polytetrafluoroethylene or other suitable plastic. The insert 2 is shown in FIG. 1, partially inserted in an outer housing 4. The polytetrafluoroethylene insert 2 is slightly resilient so that it may be forced into the outer housing 4. The insert 2 is approximately the same size and shape as the housing 4 and forms a tight fit when pressed into the housing 4. A pair of windows 6 is shown in FIG. 1A.

In assembling the cell, the windows 6 are forced inwardly against an opening 8 in the insert 4. The windows 6 have a tapered or beveled edge 10, which is similar to a taper 12 on the opening 8. The taper is shown more clearly in FIG. 1B. This arrangement forms a seal between the insert 4 and the windows 6 when the windows are forced inwardly against the openings 8. After the windows 6 are pressed in place with respect to the insert 2, the partial assembly is forced downwardly into the metal housing 4. The housing 4 is machined to precision tolerances along the sides, and has a pair of openings 14 therein. Two sides of the housing 4 position the windows 6 and hold them in a parallel position. The windows 6 are wedged in place by the resilience of the polytetrafluoroethylene insert 2.

The second embodiment of the invention shown in FIGS. 2 and 3 is generally similar to the first embodiment; however, it has a shape generally similar to a right circular cylinder. An insert 20 is made of plastic or other suitable material and is forced inwardly into a housing 22 which is generally similar to a metal sleeve. In the second embodiment the housing 22 or metal sleeve is machined to form a pair of inner shoulders 24 for receiving a pair of windows 26. The windows 26 are held in place between the insert 20 and the housing 22. A pair of openings 28 are molded in the insert 20 and face a pair of openings 30 in the housing 22. These openings 30 allow the light rays to pass thru the windows 26 and thru the cell. The windows 26 are forced against the shoulders 24 which hold the windows 26 in a parallel arrangement.

In some cases, the insert may be made of polyethylene, vinyl or other plastic material. Polytetrafluoroethylene is used in the preferred embodiment of the invention in order to take advantage of its generally superior chemical and physical properties. However, in those applications which do not require polytetrafluoroethylene, the cost may be further reduced by selecting a cheaper and more easily molded plastic composition.

Fused silica windows are used in the preferred embodiment; however, in some cases it is desirable to use windows of other materials. For infrared analysis the windows may be made of a single crystal or other infrared transmitting material. In cases which do not require fused silica other glasses or light transmitting materials may be used to obtain additional savings.

The invention also relates to cuvettes or other sample cells. Such a cell has an insert, an outer housing and a window and may be referred to as a cuvette. A cuvette having a single window would for example, be suitable for use with a refractometer. The present invention contemplates a sample cell for optical analysis and it is not intended to limit the scope of the appended claim to the illustrated embodiments.

What is claimed is:

1. An absorption cell comprising a rigid housing defining a hollow parallelepiped and an insert defining a slightly smaller hollow parallelepiped which is slightly smaller than said housing and receivable within said housing with a close fit, said housing including a pair of parallel longitudinal walls which are opposed to each other defining openings therein and said insert including a pair of longitudinal walls which are opposed to each other defining a pair of openings optically aligned with the openings in said housing walls when said insert is disposed within said housing, a pair of optically flat quartz windows defining a shape similar to but slightly larger than the openings in said housing disposed against the inner surfaces of said longitudinal walls of said housing superposed over the openings in said housing and maintained in parallel sealing relationship thereagainst by said insert to thereby form a pair of optically aligned windows in the cell.

2. An absorption cell according to claim 1 in which said windows include a converging tapered peripheral edge and said insert includes an inwardly converging tapered edge about the periphery of the openings defined thereby adapted to receive the converging edges of said windows in an approximately mating construction, and the tapered edges of said windows differing angularly from the tapered edges of the insert.

3. An absorption cell according to claim 1 in which the insert is made of polytetrafluoroethylene.

References Cited by the Examiner

UNITED STATES PATENTS

| 1,227,196 | 5/17 | Pocock | 220—82 |
| 1,273,987 | 7/18 | Azadian | 220—82 |
| 2,048,554 | 7/36 | Kuder | 88—14 |
| 2,320,563 | 6/43 | Brelsford | 73—330 |
| 2,604,229 | 7/52 | Schwarz | 88—14 |
| 2,843,285 | 7/58 | Dodson | 220—82 |

FOREIGN PATENTS 9,968 5/96 Great Britain.

OTHER REFERENCES

Gill, Stanley J. and Rummel, Ward D.: "Teflon and Sapphire Cell for Optical Absorption Studies under High Pressure," Review of Scientific Instruments, vol. 32, June 1961, page 752.

JEWELL H. PEDERSEN, *Primary Examiner.*